United States Patent
Kalpatapu et al.

(10) Patent No.: US 11,113,357 B2
(45) Date of Patent: Sep. 7, 2021

(54) METHOD AND SYSTEM FOR ONBOARDING A VIRTUAL NETWORK FUNCTION PACKAGE UTILIZED BY ONE OR MORE NETWORK SERVICES

(71) Applicant: Infosys Limited, Bangalore (IN)

(72) Inventors: Praveen Kumar Kalpatapu, Bangalore (IN); Sreekanth Sreedevi Sasidharan, Trivandrum (IN); Devendra Singh Rawat, Bangalore (IN); Srikant Akella Vardhana, Hyderabad (IN); Anunay Kumar, Bangalore (IN)

(73) Assignee: INFOSYS LIMITED, Bangalore (IN)

( * ) Notice: Subject to any disclaimer, the term of this patent is extended or adjusted under 35 U.S.C. 154(b) by 0 days.

(21) Appl. No.: 17/013,259

(22) Filed: Sep. 4, 2020

(65) Prior Publication Data

US 2021/0075701 A1    Mar. 11, 2021

(30) Foreign Application Priority Data

Sep. 6, 2019  (IN) .............................. 201941035952

(51) Int. Cl.
*G06F 16/955* (2019.01)
*H04L 12/24* (2006.01)
(Continued)

(52) U.S. Cl.
CPC ........ *G06F 16/955* (2019.01); *H04L 41/0863* (2013.01); *H04L 41/0869* (2013.01); *H04L 41/5041* (2013.01); *H04L 61/2007* (2013.01); *H04L 63/0823* (2013.01); *H04L 41/0806* (2013.01); *H04L 41/0813* (2013.01); *H04L 41/0823* (2013.01); *H04L 41/0896* (2013.01); *H04L 41/5051* (2013.01); *H04L 43/08* (2013.01); *H04L 45/74* (2013.01); *H04L 61/103* (2013.01); *H04L 61/20* (2013.01); *H04L 61/35* (2013.01); *H04L 61/6095* (2013.01);
(Continued)

(58) Field of Classification Search
CPC . G06F 16/955; H04L 63/0823; H04L 63/123; H04L 43/08; H04L 67/16; H04L 41/0896; H04L 41/5051; H04L 41/0823; H04L 61/2007; H04L 61/6095; H04L 61/103; H04L 61/35; H04L 61/20; H04L 45/74; H04L 41/0813; H04L 41/0806; H04L 67/10
See application file for complete search history.

(56) References Cited

U.S. PATENT DOCUMENTS

2018/0337931 A1* 11/2018 Hermoni ............... G06F 16/955
2020/0076686 A1* 3/2020 Krug .................. H04L 61/2007
2020/0204428 A1   6/2020 Sasidharan et al.

* cited by examiner

*Primary Examiner* — Kyung H Shin
(74) *Attorney, Agent, or Firm* — Troutman Pepper Hamilton Sanders LLP (Rochester)

(57) ABSTRACT

Onboarding a Virtual Network Function (VNF) package utilized by multiple network services is disclosed. The VNF package is received from a vendor for network services requested by a customer. The VNF package and its contents may be uploaded on an orchestrating manager, and a NFVI admin decides workflows for the VNF package, for validating and certifying the VNF package. The VNF package is validated using multiple checks and then parameters are identified for monitoring and certifying the VNF package. The VNF package is then ready for onboarding and instantiating the network services requested by the customer.

19 Claims, 8 Drawing Sheets

(51) Int. Cl.
  *H04L 29/12* (2006.01)
  *H04L 29/06* (2006.01)
  *H04L 29/08* (2006.01)
  *H04L 12/26* (2006.01)
  *H04L 12/741* (2013.01)
(52) U.S. Cl.
  CPC ............ *H04L 63/123* (2013.01); *H04L 67/10* (2013.01); *H04L 67/16* (2013.01)

METHOD AND SYSTEM FOR ONBOARDING A VIRTUAL NETWORK FUNCTION PACKAGE UTILIZED BY ONE OR MORE NETWORK SERVICES

FIELD

The technology generally relates to virtual network function package onboarding, more particularly, to a method and system for onboarding a virtual network function package, utilized by one or more network services, in a multi vendor Network Function Virtualization Infrastructure (NFVI).

BACKGROUND

The VNF onboarding process is typically a collaborative effort between a VNF vendor and a Network Function Virtualization Infrastructure (NFVI) admin. Before a VNF is on boarded, the NFVI admin must collect prerequisite information from the VNF vendor. This includes configuration information such as the VNF format, number of networks required, East-West and North-South network connectivity, routing policy, security policy, IP ranges and performance requirements. Conventionally, while launching a new service using VNF a number of activities have to be executed. Each VNF has its own unique way of on-boarding i.e. their own license mgmt., VNF-M, data model, standards etc. Further, physical elements are also required in the process of virtualization. Therefore, the NFVI admins have been looking forward to a quicker process which is also uniform for each of the VNFs.

SUMMARY

A method for onboarding a Virtual Network Function (VNF) package utilized by one or more network services comprises a Network Function Virtualization Infrastructure (NFVI) admin identifying the VNF package and a version of the VNF package in an orchestration manager. A set of workflows is configured for the VNF package, in the orchestration manager, including a validation workflow for performing multiple validations on the VNF package, and uploading the validated VNF package, a precertification workflow for mapping a set of identifiers to the uploaded VNF package, and a certification workflow for initiating the one or more network service and certifying the VNF package based on the monitoring, and using the mapped identifiers.

A framework for onboarding a Virtual Network Function (VNF) package utilized by one or more network services comprises, a VNF catalog that has a dashboard. The dash board is configured for identifying the VNF package and a version of the VNF package by a Network Function Virtualization Infrastructure (NFVI) admin, and configuring set of workflows for the VNF package. The dashboard also comprises validation user interface for configuring validation workflow for performing multiple validations on the VNF package, and uploading the validated VNF package, a service creation user interface for configuring pre-certification workflow for mapping a set of identifiers to the uploaded VNF package, and a certification user interface for configuring certification workflow for initiating the one or more network service and certifying the VNF package based on the monitoring, and using the mapped identifiers. The framework also comprises an engine providing one or more adapters for implementing the set of workflows and the VNF onboarding. The framework can be stored on a non-transitory computer readable medium.

A non-transitory computer readable medium having stored thereon executable instructions for onboarding a Virtual Network Function (VNF) package that when executed by a processor of a computer cause the computer to perform steps comprises identifying the VNF package and a version of the VNF package in an orchestration manager, by a Network Function Virtualization Infrastructure (NFVI) admin. The computer readable medium also configures set of workflows for the VNF package, in the orchestration manager, which comprises at least a validation workflow for performing multiple validations on the VNF package, and uploading the validated VNF package, a precertification workflow for mapping a set of identifiers to the uploaded VNF package, and a certification workflow for initiating the one or more network service and certifying the VNF package based on the monitoring, and using the mapped identifiers.

DETAILED DESCRIPTION

The present disclosure will now be explained in more detail using the accompanying figures. The figures are merely for the purpose of illustration and are not limiting in any way.

Figure 1:
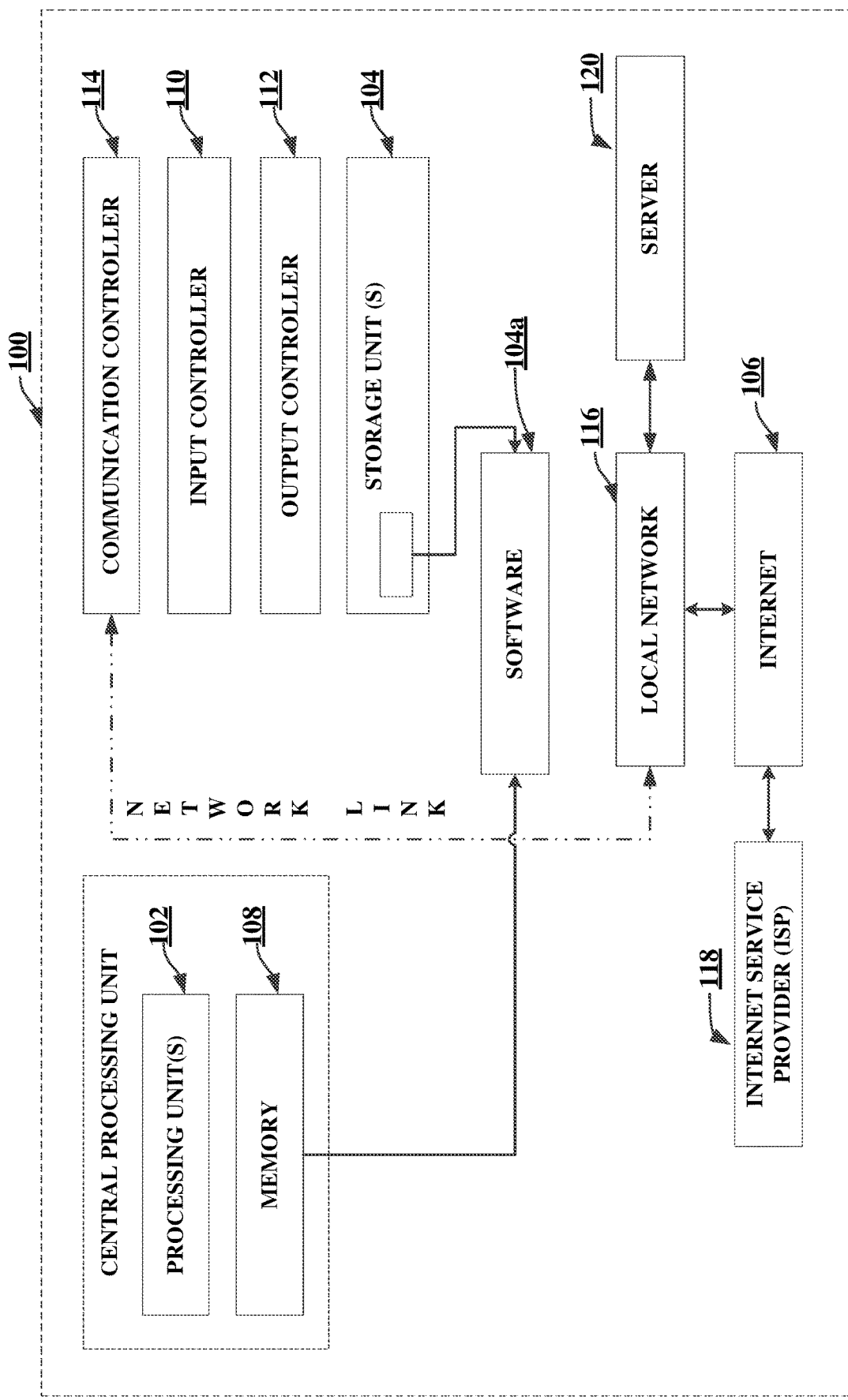
FIG. 1 represents an exemplary embodiment of a computing environment for implementing the process as described herein.

FIG. 1 is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid-state storage device and a non-transitory storage device. The storage device 104 may contain software 104a which is a set of instructions (i.e. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110 output controller 112, and any other devices (e.g., network controllers, sound controllers, etc.). Output controller 110 may be operatively coupled (e.g., via a wired or wireless connection) to a display device (e.g., a monitor, television, mobile device screen, touch-display, etc.) in such a fashion that output controller 110 can transform the display on display device (e.g., in response to modules executed). Input controller 108 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

Figure 2:
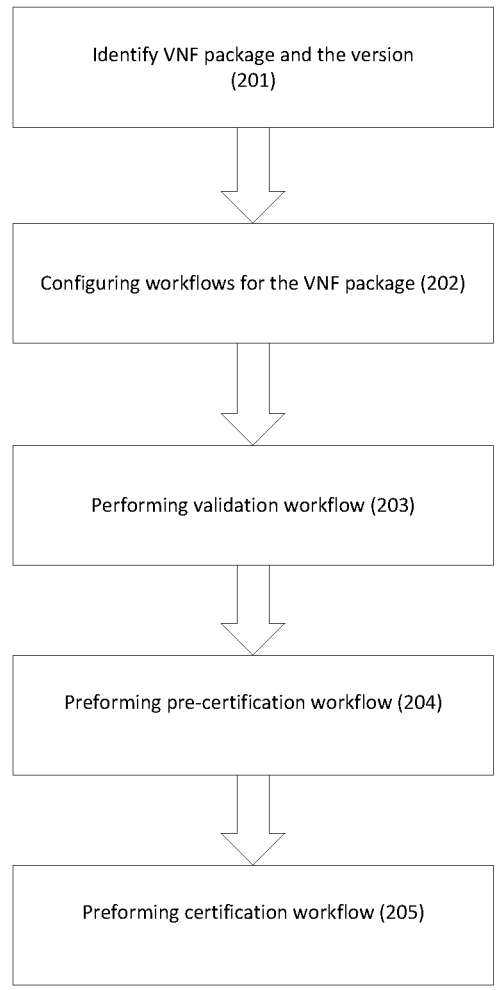
FIG. 2 represents an embodiment of the process as described herein.

The exemplary embodiment of the disclosure will now be broadly described broadly with reference to FIG. 2. Further details will be described with reference to FIGS. 3-8.

In one embodiment, a NFVI admin requests a VNF package to instantiate a network service, from a vendor. For the purpose of this document, NFVI admin refers to an entity who configures and implements the present disclosure as per the network service requirement and the user requirements. In one embodiment the NFVI admin may be the CSP, or the retail service provider or any enterprise who can validate and onboard a VNF package for the required network services.

A VNF package can be utilized for multiple network services. The network services can consist of one or more VNF packages chained to provide a particular functionality e.g. Security Service consisting of Firewall VNF, IP VPN service consisting of Router and similar other services. The vendor can provide an appropriate version of the VNF package depending on the network service required by a customer. Multiple versions of a VNF package maybe delivered at different times as per updates done to the VNF package, by the vendor. The VNF packages can be received from different vendors.

A VNF package may contain all details and descriptions of the VNF. It may contain a metadata file which allows interpreting the various artifacts in the csar files. It may contain additional definitions including VNF Life Cycle Management, Configuration files, Monitoring files, Policy Management and similar artifacts as required by the VNF during the processes as described herein. A VNF package may contain scripts for execution at various stages of processing as described herein, and VNF images. A VNF may also contain VNF-Onboarding-Compliance. This maybe in form of excel having questionnaires regarding the validation of the VNF package. The questionnaire is a checklist for estimating if the VNF can be on boarded or not. A VNF package may further contain workload specification which may include tenant details like project, quota, flavors & images to be created in VIM.

The vendor may also provide a list of onboarding questions and a design document in the VNF package. The design document may contain configuration details of the VNF package, and maybe used for setting up the VNF package.

In one embodiment, the VNF packages received by the NFVI admin may be uploaded on an orchestrating manager. The orchestrating manager is a framework which has various features for triggering and implementing the VNF onboarding.

VNF onboarding manager interfaces the multiple functionalities related to VNF onboarding. Various versions of a VNF package maybe stored on the orchestrating manager. In step 201 of FIG. 2, the NFVI admin identifies the relevant version of a VNF package on the orchestrating manager, once he receives a request for a network service from a customer.

In an embodiment, the process of VNF onboarding includes multiple checks and validations. For the validations, the VNF package has to go through multiple workflows. The NFVI admin can decide the workflows for the VNF package. The workflows are configurable as per the requirements of user and the network services.

The workflows may also be configured as per the environment where the network services are to be implemented. In one embodiment, a NFVI environment. may consist of an image repository which is a hierarchal storage location to store virtual network function images. Typically a CI/CD Stack provides this functionality. An NFVI environment may also include a Virtual Infra Manager (VIM), which is the functionality in the NFVI environment, for providing the management of resources in NFVI. VIM is a product component installed on top of compute and storage hardware.

An NFVI environment may further comprise a NFV Orchestrator (NFVO) of the NFVI environment which is responsible for the management of Virtual Network Functions in the NFVI. It is responsible for the service and resource orchestration. NFVI admin will also have a testing environment to test the VNF and perform progression and regression testing, and a monitoring environment to monitor VNF to verify against benchmarks.

In one embodiment, NFVO and VIM maybe the essential components of a NFVI environment.

In step 202, the NFVI admin configures the appropriate workflows for the VNF package. The NFVI admin can add or remove one or more workflows from the orchestrating manager. In one embodiment, a VNF package is configured with three mandatory workflows—validation workflow (203), precertification workflow (204), and a certification workflow (205). The steps of each workflow may also be configurable.

In one embodiment, the validation workflow (203) may include multiple checks including vulnerability, checksum validation, package corruption and similar other checks as considered appropriate. As a part of validation workflow, the VNF package is imported from the orchestrating manager, and validated with respect to the onboarding questions provided by the vendor. After the validations, the VNF package is uploaded in the repository, VIM and NFVO. The validation workflow will be described in more details, with reference to FIG. 3.

In step 204, the VNF package goes through precertification workflow. This workflow prepares the VNF package for the certification workflow (205). In one embodiment, the design document received in the VNF package, is used for identifying the artifacts and identifiers which are to be associated with the VNF package. The associated parameters are used for monitoring the VNF package and accordingly certify. The NFVI admin may configure the set of parameters to be associated with the VNF package. The precertification workflow will be described in further detail with reference to FIG. 4.

In step 205, the VNF package goes through the certification workflow. This certifies the VNF usage for a given NFVI admin environment. The certification workflow allows the network services requested by the customer to be tested and instantiated, and then the VNF is instantiated. The certification workflow will be further explained with reference to FIG. 5.

Figure 3:
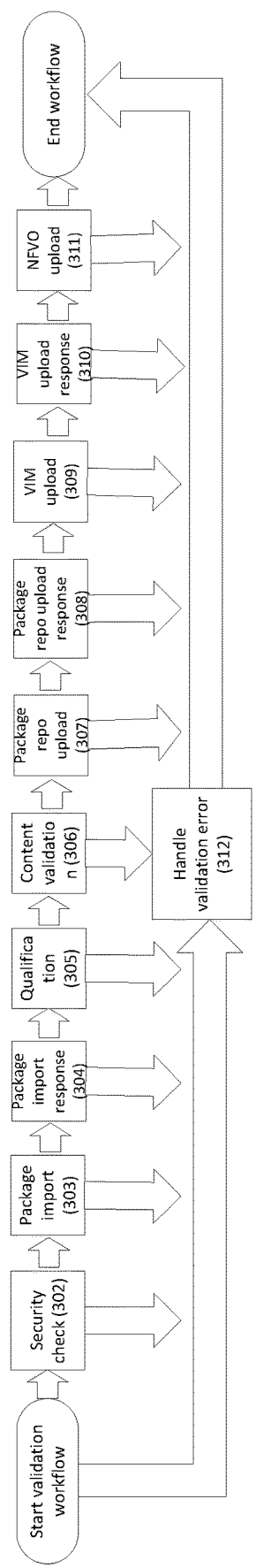
FIG. 3 represents an embodiment of the validation workflow of the present disclosure.

FIG. 3 is an exemplary embodiment of the validation workflow for the VNF package. The VNF package which is identified by the NFVI admin, is initially checked for errors and security issues by the NFVI admin (302). The NFVI admin can trigger an appropriate security tool or software for the checks. If the security check response is success, the VNF package is imported (303), and the various artifacts of the VNF package are made accessible to the orchestrating manager. The package import is checked if all artifacts are accessible for validations and processing as required. Once the VNF package import response is successful (304), the VNF package is checked for satisfying the qualification requirements as mentioned in the onboarding Compliance (305). The onboarding compliance requirements may be sent by the vendor in an excel or any other suitable format as configured by the NFVI admin. The orchestrating manager may check if the VNF package completes all the requirements mentioned. The qualification requirements may relate to mapping of VNF packages to NFVI capabilities.

Once the VNF package satisfies the qualification requirements, it proceeds for data model compatibility check (306). The package compatibility check standards may be defined by NFVI admin. The compatibility check may comprise of various validators including data type, node type relationships with respect to a predecided data model. The NFVI admin can choose an appropriate data model.

Once the validations are done, the VNF package is uploaded at some predefined locations. The VNF package may be first uploaded to a package repository on the orchestrating manager (307). It may be stored in a hierarchical structure with tags detailing the workflow stage of the VNF. Uploading the VNF package to this repository makes it available for reuse as and when needed by a NFVI admin.

On receiving successful response (308) for the repository upload, the VNF package is uploaded to the Virtual Infrastructure Manager (VIM) (309). VIM provides a platform for the VNF and network service implementation. VIM uploading may also include creation of the tenancy, quota, users, flavors for the VNF package, and uploading the VNF images. These parameters define the infrastructure, memory, RAM etc requirements of the VNF package and maybe configured by the NFVI admin as needed.

After completing the VIM upload successfully (310), the VNF package is uploaded to the NFVO (311). VIM and NFVO form the components of a virtualized network. NFVO may enable creation of the required network service, for which the VNF package was procured from the vendor. The validation workflow may also check for errors during each of the checks and uploads (312). At any of the steps of the validation workflow, if any error is found, the VNF validation does not proceed to the next step. The error maybe handled at the same step, or the validation workflow maybe stopped for the erroneous VNF package. The validation workflow may have further steps as configured and required by the VNFI admin, and also the user. Some further steps may be integrating to external security tool, integrating to Config repository, translation of data models and similar steps as required.

The VNF package completes all checks and scans in the validation workflow, and on successful responses, it may proceed for a pre-certification workflow.

Figure 4:
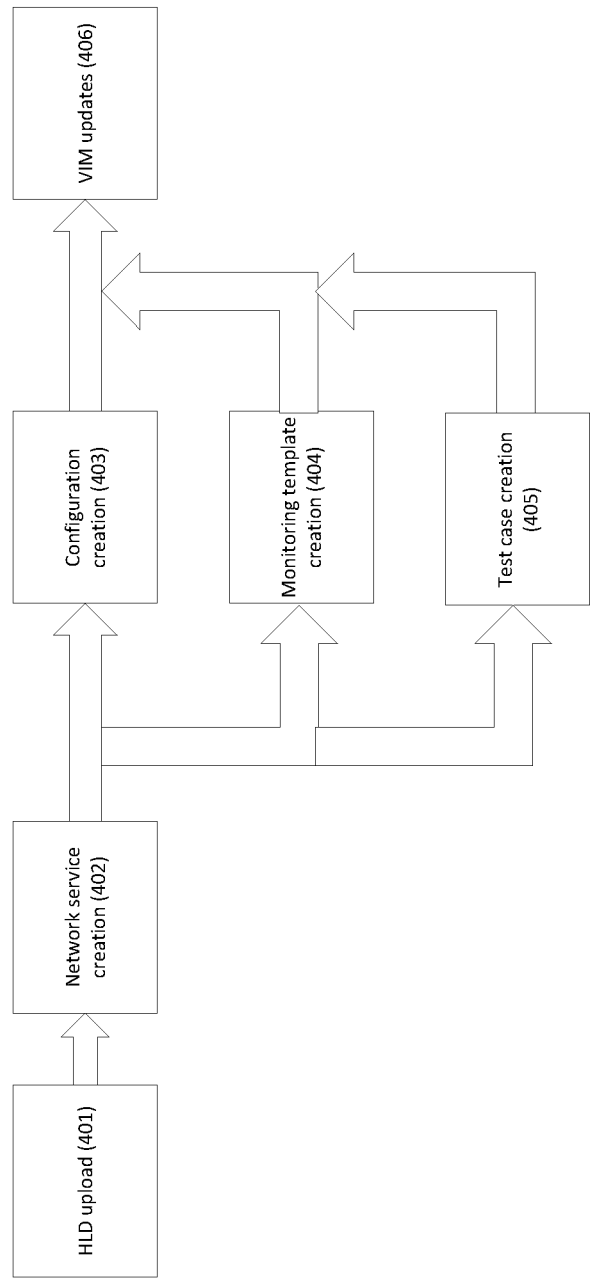
FIG. 4 represents an embodiment of the pre-certification workflow of the present disclosure.

FIG. 4 refers to an exemplary embodiment of the pre-certification workflow for the VNF package, after finishing the validation workflow.

In an embodiment, the NFVI admin decides the configuration of the orchestrating manager, for the pre-certification of the VNF package. This process prepares the VNF package for the later workflows, including the certification workflow. The High Level Design (HLD) document is fetched (401). This document may be provided by the VNF package vendor.

The NFVI admin accesses the HLD to analyze the VNF package. The HLD has details about the VNF package, including configuration, network services and other related parameters. The HLD also provides details on how the VNF package should be setup in NFVI environment. The details may include functionalities it exposes, which are required to be tested, what licensing model it has and similar functionalities.

Based on the above NFVI admin creates the network services (402) which the customer had requested, in the NFVO. The HLD also provides further details including configuration details, and monitoring details. Based on these details a configuration template, and a monitoring template is created (403, 404). These are uploaded in the orchestrating manager. A configuration identifier is created, and a monitoring identifier is created. These identifiers are used during the certification workflow.

Using the HLD and network services created, required number of test cases and test suites will be created (405). These are updated and used in the orchestrating manager.

VIM is accordingly updated with the above identifiers.

The workflow may include creating further template and identifiers as required by the NFVI admin, and provided in the HLD. The parameters for creating templates and identifiers are configurable.

Figure 5:
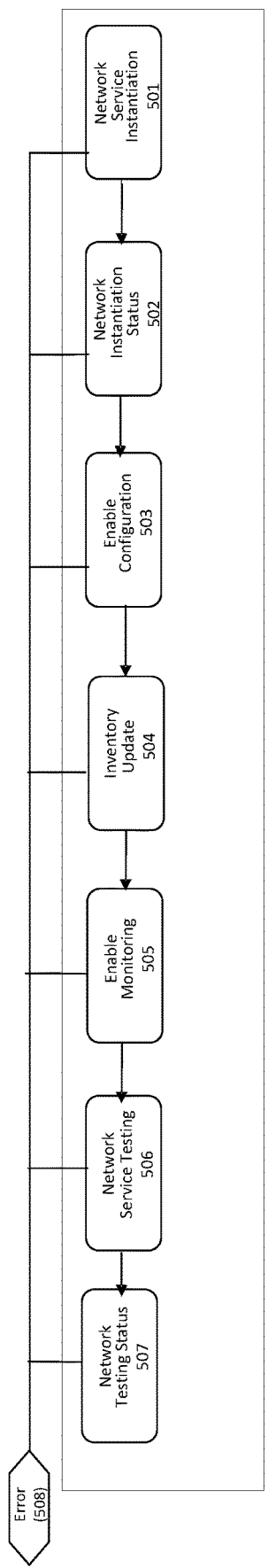
FIG. 5 represents an embodiment of the certification workflow of the present disclosure.

FIG. 5 relates to an exemplary embodiment of the certification workflow of the VNF package. After the validation and pre-certification workflows, the VNF package proceeds for the certification workflow. After all validations of the VNF package is done, parameters are created to monitor the network services, the network services are ready for instantiation. The network services are tested using the test case as explained in FIG. 4. The network services are then instantiated (501). Once the network service instantiation status shows successful (502), the VNF package is configured using the identifier created in the pre-certification workflow (503). The configuration may include firewall details, gateways details and similar related details.

The configured VNF package may be then updated in the inventory management system (504). Any custom inventory updates required may be done. The VNF package is then set up for monitoring using the identifiers created in the per-certification workflow (505). The monitoring may include setting alerts, resource usage and other related parameters.

Once the VNF package monitoring is initiated, execution of the relevant test cases to test the VNF is initiated (506). The test scripts may be part of the VNF package or created depending on the Network service. The testing may cover functional and non-functional scenarios. Once the network testing is successfully completed, (507) the certification workflow is completed, and the VNF onboarding is completed. The certification workflow may also include error notification (508). In the event of any monitoring and any other process throwing errors, the process maybe halted and checked before moving to the next step in the workflow.

Figure 6:
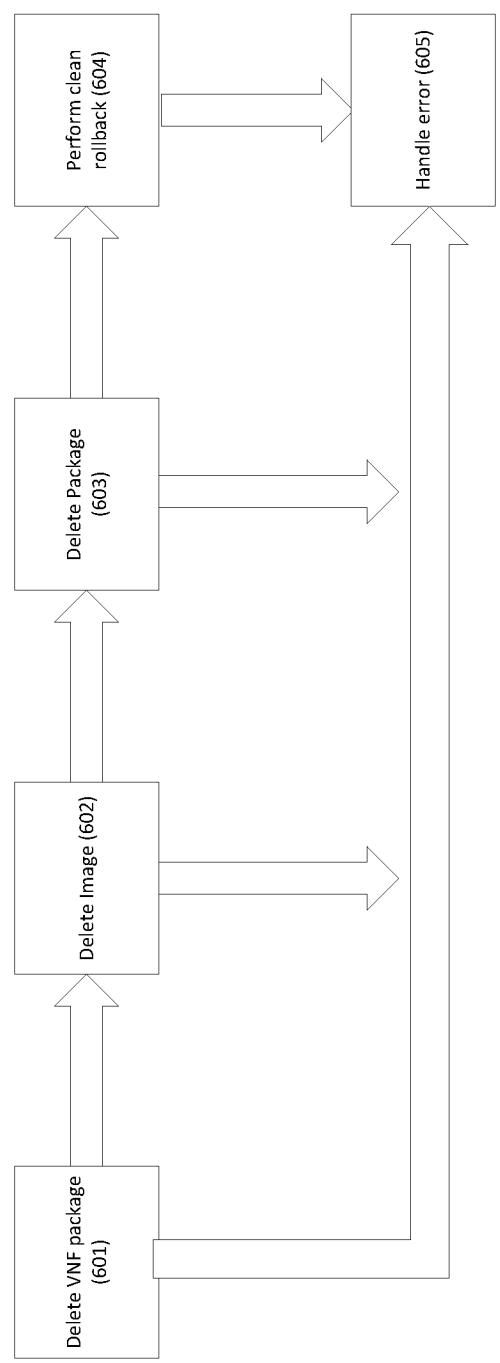
FIG. 6 represents an embodiment of the rollback validation of the present disclosure.

FIG. 6 relates to an exemplary embodiment of the rollback validation workflow. During the validation workflow, if a failure occurs due any of the parameters e.g. invalid data, external errors etc, the rollback validation process is initiated. In the event of such failure, the VNF package maybe completely removed from the orchestrating manager, by doing a roll back on the validation workflow. VNF Package is initially deleted from the NFVO (601). Later the VNF package and the contents are deleted from the VIM (602). The VNF package is then deleted from the repository (603). Finally, the VNF package maybe totally cleaned from the orchestrating manager, thus performing a complete roll back (604). The VNF package is cleaned in a reverse order of upload. Later the failure may be handled and corrected in appropriate manner (605), depending on the reason of the failure.

Figure 7:
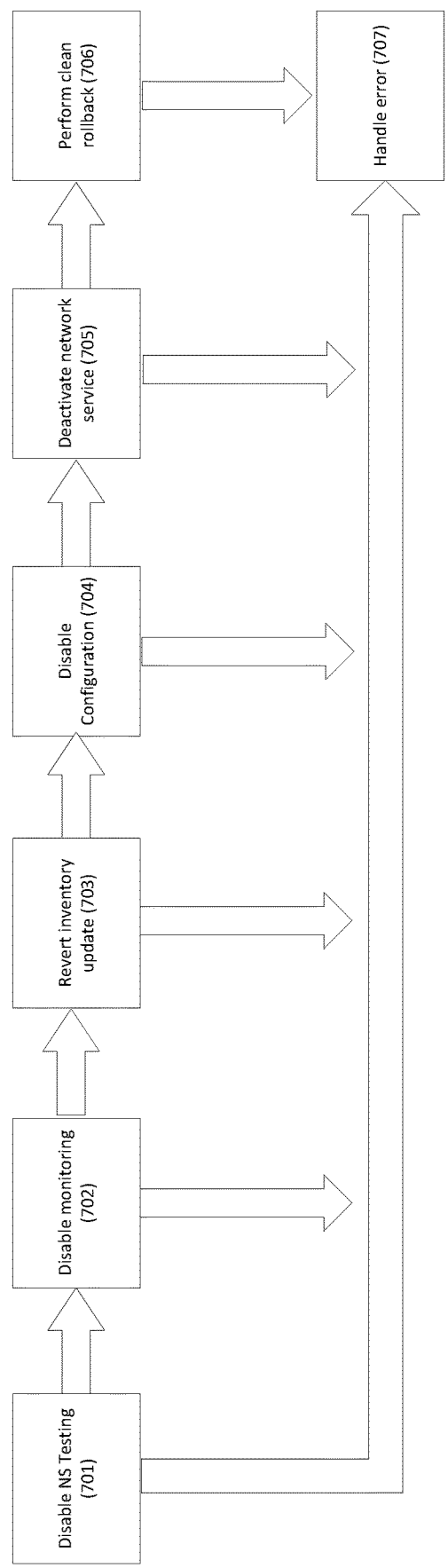
FIG. 7 represents an embodiment of the rollback certification workflow.

FIG. 7 relates to an exemplary embodiment of the rollback certification workflow. This workflow is responsible for performing any cleanup activities in the event of a failure while performing certification workflow. In one embodiment, initially the network service testing is disabled (701). It includes clearing testing status for the network service. Later the monitoring of the VNF package using the monitoring template, is disabled (702). Inventory updates deletes the VNF package from the Inventory management system (703). In step 704, VNF configuration is deleted from the Configuration Management system. Then the network services are deleted in the NFVO (705). After the above steps, the status of the VNF is a clean rollback (706). Later the failure may be handled and corrected in appropriate manner (707), depending on the reason of the failure.

The workflows for the VNF package are configured by the VNFI admin. Each of the described workflows can have further steps, monitoring, checks and similar other steps as required by user or by the VNFI environment. The NFVI admin can also remove some steps if needed. There can also be further workflows added for a VNF package. Such added workflows can be updating of a VNF package, decommissioning a VNF package and any other as needed.

Figure 8:
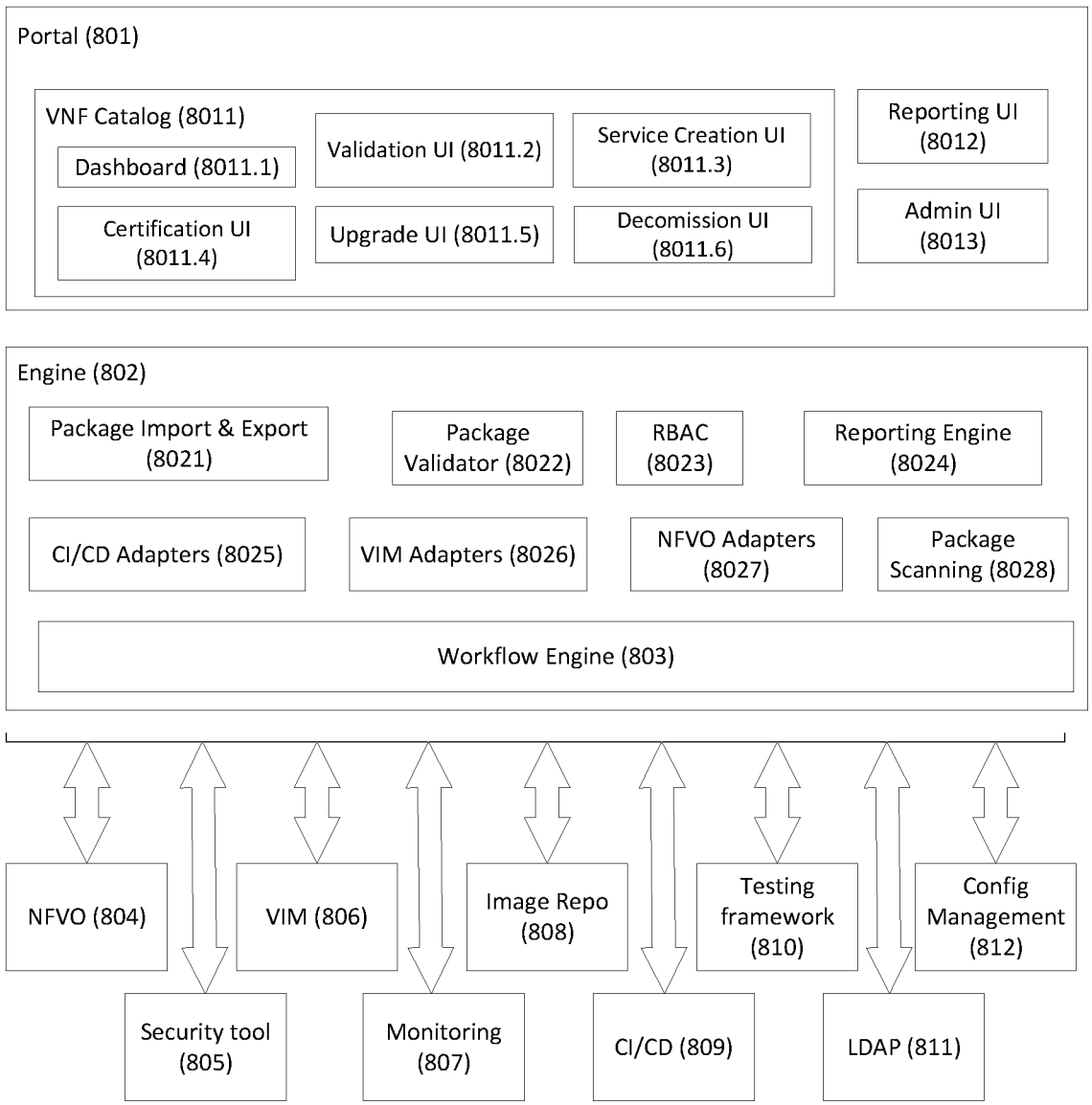
FIG. 8 represents a preferred architecture for implementing an embodiment of the process disclosed herein.

FIG. 8 relates to an exemplary embodiment of the architecture for implementing the process as disclosed herein.

The architecture relates to the framework referred to as an orchestrating manager and its components configured to implement the VNF package onboarding as explained herein. The orchestrating manager majorly comprises of the front end user interfaces, display interfaces, adapters, and the processors and engines configures to implement the onboarding. The orchestrating manager has been alternatively referred as a system in this document.

The portal (801) of the system contains a VNF catalog (8011) which carries most of the front end interfaces and displays of the orchestrating manager. The VNF catalog may contain a dashboard (8011.1) carrying all the status details of a VNF package which may presently be ongoing through the onboarding process. The dashboard (8011.1) accordingly displays which workflow is under process, and if the workflows are successful. The dashboard (8011.1) can display the same through some controls and icons. The dashboard (8011.1) also shows all the VNF packages which have been uploaded in the system repository, and their status.

The Validation UI (8011.2) on the VNF catalog (8011) contains controls and other means for triggering, monitoring, controlling and any other processing or modification of the validation workflow against each of the VNF packages. After triggering the status may be seen on the dashboard (8011.1).

The service creation UI (8011.3) on the VNF catalog (8011) contains controls and other means for triggering, monitor, controlling and any other processing or modification of the pre-certification workflow against each of the VNF packages. After triggering the status may be seen on the dashboard (8011.1).

The Certification UI (8011.4) on the VNF catalog (8011) contains controls and other means for triggering, monitor, controlling and any other processing or modification of the certification workflow against each of the VNF packages. After triggering the status may be seen on the dashboard (8011.1).

The VNF catalog (8011) contains instructions and is configured to trigger, monitor, control and any other processing or modification of any of the workflows identified and created by the NFVI admin for a VNF package. In this embodiment, the figure shows an upgrade UI (8011.5) and a decommission UI (8011.6) which have instructions and are configured to trigger, monitor, control and any other processing or modification of upgrading a VNF package workflow, and decommissioning a VNF package workflow. Similarly, any other workflow configured by the NFVI admin are available on dashboard (8011.1) for all required processing.

Reporting UI (8012) may not be a part of the VNF catalog (8011). It may be available as a separate control on the Portal (801). The reporting UI (8012) may provide a view and detailed report of the VNF by required parameters like Firewall, Router, vendors or any other parameter as configured by the user or NFVI admin. The reports can be exported for any desired usage externally.

The admin UI (8013) may provide access for admin functionalities like creating groups, adding users, defining customized workflows etc. Admin UI access may be restricted to few members only.

The Engine (802) of the system may majorly contain the various adapters configured to address compatibility and implementation across various platforms, domains regarding the various processes of the onboarding, along with other relevant components.

The Package Import & Export component (8021) has instructions and configurations to upload or export a VNF package to the system repository during the validation workflow. This component may also be configured to remove package from the repository in case of rollbacks.

The Package Validator (8022) has instructions and configurations to implement the validation workflow of a VNF package as explained herein, after the Package Import & Export component (8021) uploads the VNF package to the repository.

The Engine (802) may further have a RBAC component (8023) configured for performing authentications of the users, NFVI admins, VNF package and other entities as required by the onboarding process, and as per user requirements, and the environments.

The Reporting Engine (8024) is mapped to the Reporting UI (8012) and enables preparing of the reports as desired. The reporting engine is configurable and can provide user desired parameters and formats for preparing a report, and exporting it.

CI/CD Adapters (8025) interacts with CI/CD Tools to support different business processes. CI/CD adapters can be used to invoke any extra steps in the workflow for e.g. Integrate to external security tool, Integrate to Config repos, Translation of data models and other required steps.

VIM Adapters (8026) interacts with VIM (806) for image management of the VNF package once the VNF package contents are uploaded on the VIM (806). The interaction may include uploading the image to VIM, creation of tenancy, modifying the tenancy and other VIM related functionalities.

NFVO Adapters (8027) interacts with NFVO for VNF package and their network service instantiation.

Package Scanning (8028) interacts with NFVI Security Tools and the Framework for scanning of the VNF package before the onboarding.

Workflow engine (803) interacts with all the tools and applications of the VNFI environment which implement the processes and workflow of the present disclosure.

In an embodiment, VNFI environment may include the following, as described below.

The NFVO (804) is configured to implement creating and instantiating the network services related to the VNF package. It works in coordination with the NFVO adapter (8027).

The security tools (805) are configured for the scanning of the VNF package. Package scanning adapter (8028) enables working of the security tools (805) across multiple platforms. Security tools can be configured and can be any of standard security tools as needed and configured by users and the NFVI admin.

The VIM (806) provides a platform for the VNF package. VIM adapters (8026) enables the VIM (806) across various platforms.

Monitoring component (807) is configured to enable the monitoring parameters during the pre-certification workflow.

Image repository (808) is a part of the storage component of the system where various artifacts of the VNF package may be stored appropriately.

CI/CD (809) takes care of integration to external security tool, integrate to Config repos, translation of data models and other required steps.

Testing framework (810) is configured to implement the testing of the network services, and other testing requirements of the system.

LDAP (811) component enables client/server protocol to access and manage directory information. It reads and edits directories over IP networks and enables data transfer.

Config Management (812) component of the system systematically manage, organize, and control the changes and configuration updates of the various artifacts of the complete VNF onboarding and network instantiating processes.

The present disclosure will now be explained with the support of a working example. The details and the data provided here are only for the purpose of illustration of a working example of an embodiment of the disclosure. They are in no way limiting to the scope of the disclosure.

In an example, a NFVI admin wants to offer a network service to the customers regarding Video on Demand (VoD). The NFVI admin receives a VNF package named hello-VoD.csar from a vendor, whom he had requested. The NFVI admin will now validate, and certify hello-VoD.csar before offering the service to its customers.

In the present example, hello-VoD.csar includes the following—
TOSCA-Metadata/
Definitions/vnf-descriptor.yaml
Scripts/
Images/
VNF—Onboarding—Compliance
WorkloadSpecification hello-VoD.csar package folder is saved in a folder structure which is accessible by an orchestrating manager application. When the NFVI admin has to initiate the checking of hello-VoD.csar, he accesses the orchestrating manager. For the present example, the NFVI admin identifies hello-VoD.csar ver 1.2 for the VoD network service. Also for the purpose of the present example, the NFVI admin environment contains—
Image Repository—NEXUS
VIM—Openstack,
NFV Orchestrator—OpenBaton
Monitoring service—(Prometheus)
Testing—(virtual CPE testing Environment)

For the above NFVI admin environment, and hello-VoD.csar ver 1.2 artifacts, the NFVI admin wants to configure Validation workflow, Pre-certification workflow and Certification workflow. The orchestrating manager starts validation workflow, when NFVI admin triggers the onboarding process.

The onboarding manager initiates package corruption check for hello-VoD.csar ver1.2. Once the check is successful, the orchestrating manager accesses the folder structure where hello-VoD.csar ver 1.2 is saved, and retrieves it from there and the VNF-Onboarding-Compliance included in the package is accessed. The orchestrating manager takes care of the compliance requirements. For the present example, the compliance requirements are—

| | |
|---|---|
| Has the VNF been booted under OpenStack version described in NFVI admin's Requirements Document? | Yes |
| Has the VNF been booted under KVM prescribed in NFVI admin's Requirements document? | Yes |
| Does any of the interfaces requires floating-IP address assignment? | yes, no |
| Does any of the interfaces requires anti-spoofing (port security) disabled? | yes, no |
| Does it require affinity/anti-affinity placements? | No |

-continued

| | |
|---|---|
| Do all of the VNF's Management Interfaces have DHCP enabled? | yes, no |
| Does any of the interfaces requires static IP address assignment at boot? | yes, no |
| What are the different type of interface required by the VNF | PCI-passthrough, SR-IOV, Virt-io |

After checking the compliance requirements, the orchestrating manager checks the data structure and node structure of hello-VoD.csar ver 1.2. The validation workflow then moves to uploading the contents of hello-VoD.csar ver 1.2 to a NEXUS repository in the onboarding manager. hello-VoD.csar ver 1.2 contents are also uploaded on the VIM, Openstack. The tenancy, quota, users, flavors are also uploaded in Openstack. For the present example, following details are uploaded—
Tenancy—Media-Group (Openstack Project)
Quota—vCPU: 100, RAM: 200 GB, Storage: 500 GB
Users: 10
Flavors. M1-medium Finally VNF package is uploaded on Openbaton NFVO. For this example, we assume no error was notified.

The NFVI admin then selects pre-Certification for hello-VoD.csar ver 1.2.
HelloVoD.doc is the high level design document for the VNF package. The NFVI admin creates the network service for hello-VoD.csar ver 1.2 i.e. providing the video on demand. NFVI admin checks HelloVoD.doc and extracts details regarding monitoring of the video on demand, creates monitoring identifiers and uploads them on Openstack. Test cases T1.txt are created at this stage.

Finally NFVI admin triggers the Certification workflow. The VNF package has been checked for errors, compliance requirements, tenancy quota and so forth has been created, monitoring identifiers created and network service is created. The VNF package is ready for onboarding.

The video on demand network service is instantiated. Once instantiation is done successfully, hello-VoD.csar is configured using the monitoring identifier, and inventory management service is updated. Monitoring is enabled for hello-VoD.csar and T1.txt test case is used for testing the video on demand network service network service.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

We claim:
1. A method for onboarding a Virtual Network Function (VNF) package utilized by one or more network services, comprising:
receiving an identification of a version of the VNF package;
performing one or more validations on the VNF package, and uploading the VNF package when the one or more validations are successfully performed;
executing a precertification by mapping a set of identifiers to the uploaded VNF package; and
executing a certification by initiating the one or more network services and certifying the VNF package based on setting up monitoring using the mapped identifiers;
wherein a rollback validation is executed to delete the uploaded VNF package when the performing one or more validations fail and a rollback certification is executed to remove configurations and the monitoring when the executing the certification fails.

2. The method of claim 1, wherein the VNF package comprises metadata, scripts, descriptors and a Virtual Infrastructure Manager (VIM) configuration.

3. The method of claim 1, wherein the performing the one or more validations further comprises performing a qualification check.

4. The method of claim 3, wherein the performing the one or more validations further comprises:
validating contents of the VNF package;
performing one or more checks on the VNF package; and
uploading the VNF package to an image repository, a Virtual Infrastructure Manager (VIM), and a Network functions virtualization Orchestration (NFVO) for creating the one or more network services.

5. The method of claim 1, wherein the executing the precertification further comprises:
checking a profile of the VNF package using a High Level Design (HLD) document,
creating the one or more network services;
identifying the set of identifiers for the one or more network service, based on the HLD document; and
creating one or more test cases for testing the created network services.

6. The method of claim 5, wherein the executing the certification further comprises initiating the monitoring of the VNF package and testing the one or more network service using the one or more test cases.

7. The method of claim 1, wherein onboarding the VNF package comprises error detection and a notification at preconfigured state.

8. A non-transitory computer readable medium having stored thereon executable instructions for onboarding a Virtual Network Function (VNF) package utilized by one or more network services that when executed by a processor of a computer cause the computer to perform steps comprising:
receiving an identification of a version of the VNF package;
performing one or more validations on the VNF package, and uploading the VNF package when the one or more validations are successfully performed;
executing a precertification by mapping a set of identifiers to the uploaded VNF package; and
executing a certification by initiating the one or more network services and certifying the VNF package based on setting up monitoring using the mapped identifiers;

wherein a rollback validation is executed to delete the uploaded VNF package when the performing one or more validations fail and a rollback certification is executed to remove configurations and the monitoring when the executing the certification fails.

9. The computer readable medium of claim 8, wherein the performing the one or more validations further comprises performing a qualification check.

10. The computer readable medium of claim 9, wherein the performing the one or more validations further comprises:
   wherein the performing the one or more validations further comprises:
      validating contents of the VNF package;
      performing one or more checks on the VNF package; and
      uploading the VNF package to an image repository, a Virtual Infrastructure Manager (VIM), and a Network functions virtualization Orchestration (NFVO) for creating the one or more network services.

11. The computer readable medium of claim 8, wherein the executing the precertification further comprises:
   checking a profile of the VNF package using a High Level Design (HLD) document,
   creating the one or more network services;
   identifying the set of identifiers for the one or more network service, based on the HLD document; and
   creating one or more test cases for testing the created network services.

12. The computer readable medium of claim 8, wherein the executing the certification further comprises initiating the monitoring of the VNF package and testing the one or more network service using the one or more test cases.

13. The computer readable medium of claim 8, wherein the VNF package comprises metadata, scripts, descriptors and a Virtual Infrastructure Manager (VIM) configuration.

14. A computing device comprising a memory comprising programmed instructions stored thereon and at least one processor configured to be capable of executing the programmed instructions to:
   receive an identification of a version of the VNF package;
   performing one or more validations on the VNF package, and uploading the VNF package when the one or more validations are successfully performed;
   execute a precertification by mapping a set of identifiers to the uploaded VNF package; and
   execute a certification by initiating the one or more network services and certifying the VNF package based on setting up monitoring using the mapped identifiers;
   wherein a rollback validation is executed to delete the uploaded VNF package when the perform one or more validations fail and a rollback certification is executed to remove configurations and the monitoring when the execute the certification fails.

15. The device of claim 14, wherein the performing the one or more validations further comprises performing a qualification check.

16. The device of claim 15, wherein for the performing the one or more validations, the at least one processor is further configured to be capable of executing the programmed instructions to:
   validate contents of the VNF package;
   perform one or more checks on the VNF package; and
   upload the VNF package to an image repository, a Virtual Infrastructure Manager (VIM), and a Network functions virtualization Orchestration (NFVO) for creating the one or more network services.

17. The device of claim 14, wherein for the executing the precertification, the at least one processor is further configured to be capable of executing the programmed instructions to:
   check a profile of the VNF package using a High Level Design (HLD) document,
   create the one or more network services;
   identify the set of identifiers for the one or more network service, based on the HLD document; and
   create one or more test cases for testing the created network services.

18. The device of claim 14, wherein for the executing the certification the at least one processor is further configured to be capable of executing the programmed instructions to:
   initiate the monitoring of the VNF package and testing the one or more network service using the one or more test cases.

19. The device of claim 14, wherein the VNF package comprises metadata, scripts, descriptors and a Virtual Infrastructure Manager (VIM) configuration.

* * * * *